(12) United States Patent
Linton et al.

(10) Patent No.: US 12,597,812 B2
(45) Date of Patent: Apr. 7, 2026

(54) BEARING SUPPORT FORMING ELECTRO MAGNETIC SHIELD FOR RESOLVER POSITION SENSOR FOR A BRUSHLESS ELECTRIC MOTOR

(71) Applicant: Schaeffler Technologies AG & Co. KG, Herzogenaurach (DE)

(72) Inventors: Daniel Linton, North Canton, OH (US); Daniel Chudzinski, Seville, OH (US); Baylor Hartzler, Wooster, OH (US); Noah Riggenbach, Smithville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 258 days.

(21) Appl. No.: 18/220,325

(22) Filed: Jul. 11, 2023

(65) Prior Publication Data

US 2025/0023401 A1     Jan. 16, 2025

(51) Int. Cl.
H02K 1/18 (2006.01)
H02K 5/16 (2006.01)
(Continued)

(52) U.S. Cl.
CPC .............. H02K 1/18 (2013.01); H02K 5/163 (2013.01); H02K 11/02 (2013.01); H02K 11/20 (2016.01); H02K 15/02 (2013.01)

(58) Field of Classification Search
CPC .......... H02K 1/18; H02K 5/163; H02K 11/02; H02K 11/20; H02K 15/02; H02K 11/0141; H02K 11/225
See application file for complete search history.

(56) References Cited

U.S. PATENT DOCUMENTS

| | | | |
|---|---|---|---|
| 7,995,355 | B2 | 8/2011 | Cochrane |
| 2007/0297160 | A1 | 12/2007 | Cochrane et al. |
| 2016/0174420 | A1 | 6/2016 | Cochrane |

FOREIGN PATENT DOCUMENTS

| | | | | |
|---|---|---|---|---|
| JP | 2002136055 | A | * | 5/2002 |
| JP | 2008104321 | A | * | 5/2008 |
| JP | 2009296718 | A | * | 12/2009 ............. H02K 11/40 |

OTHER PUBLICATIONS

JP2008104321A English translation (Year: 2025).*
(Continued)

*Primary Examiner* — Christopher M Koehler
*Assistant Examiner* — Viswanathan Subramanian
(74) *Attorney, Agent, or Firm* — Davidson Kappel LLC

(57) ABSTRACT

A motor assembly includes a brushless electric motor including a motor stator and a motor rotor configured for rotating within the motor stator. The motor stator includes a plurality of windings. The brushless electric motor also includes a rotor shaft non-rotatably connected to the motor rotor for rotating with the motor rotor and a resolver position sensor including a resolver stator and a resolver rotor configured for rotating within the resolver stator. The resolver rotor is non-rotatably connected to the rotor shaft for rotating with the rotor shaft. The resolver stator generates a signal based on a rotational position of the resolver rotor. The brushless electric motor also includes a rotor shaft bearing coupled to the rotor shaft and a bearing support supporting the rotor shaft bearing to allow the rotor shaft to rotate with respect to the bearing support. The bearing support is or includes an electromagnetic interference shield to reduce or block electromagnetic waves emitted by the windings of the motor stator from interfering with the signal generated by the resolver stator.

18 Claims, 4 Drawing Sheets

(51) Int. Cl.
H02K 11/02 (2016.01)
H02K 11/20 (2016.01)
H02K 15/02 (2006.01)

(56) References Cited

OTHER PUBLICATIONS

JP2009296718A English translation (Year: 2025).*
JP2002136055A English translation (Year: 2025).*
NPLChen (Year: 2021).*

* cited by examiner

BEARING SUPPORT FORMING ELECTRO MAGNETIC SHIELD FOR RESOLVER POSITION SENSOR FOR A BRUSHLESS ELECTRIC MOTOR

TECHNICAL FIELD

The present disclosure relates generally to brushless electric motors, and more specifically to resolver position sensors for brushless electric motors.

BACKGROUND

Resolver position sensors can be used with brushless electric motors to provide position feedback for control and commutation purposes.

SUMMARY

A motor assembly includes a brushless electric motor including a motor stator and a motor rotor configured for rotating within the motor stator. The motor stator includes a plurality of windings. The brushless electric motor also includes a rotor shaft non-rotatably connected to the motor rotor for rotating with the motor rotor and a resolver position sensor including a resolver stator and a resolver rotor configured for rotating within the resolver stator. The resolver rotor is non-rotatably connected to the rotor shaft for rotating with the rotor shaft. The resolver stator generates a signal based on a rotational position of the resolver rotor. The brushless electric motor also includes a rotor shaft bearing coupled to the rotor shaft and a bearing support supporting the rotor shaft bearing to allow the rotor shaft to rotate with respect to the bearing support. The bearing support is or includes an electromagnetic interference shield to reduce or block electromagnetic waves emitted by the windings of the motor stator from interfering with the signal generated by the resolver stator.

In examples, the motor assembly further includes an end housing that is or includes an electromagnetic interference shield to reduce or block electromagnetic waves emitted by the windings of the motor stator from interfering with the signal generated by the resolver stator.

In examples, the end housing and bearing support overlap each other to fully surround an outer diameter of the resolver position sensor.

In examples, the end housing includes a pilot, an outer circumferential surface of the bearing support being received inside of the pilot.

In examples, the motor assembly further includes a fastener fixing the resolver stator and bearing support to the end housing.

In examples, the bearing support is axially between the motor rotor and the resolver rotor.

In examples, the windings have voltage of 400 to 800 volts and the signal generated by the resolver stator has a voltage of 2 to 12 volts.

In examples, an electrically conductive metallic material forming the bearing support is the electromagnetic interference shield, or an electrically conductive metallic coating on the bearing support is the electromagnetic interference shield.

In examples, the bearing support is fixed to the resolver stator, the bearing support includes an axially extending rim supporting the rotor shaft bearing and extending axially away from the resolver stator, the bearing support includes a flange radially outside of at least a portion of the resolver stator, and the axially extending rim and the flange arranged and configured for shielding the resolver position sensor from electromagnetic waves originating from radially outside of the axially extending rim and the flange.

In examples, the bearing support further includes an inner lip protruding radially inward from the axially extending rim, and the inner lip includes a first axially facing surface facing the resolver stator and a second axially facing surface, opposite of the first axially facing surface, facing the rotor shaft bearing.

In examples, at least a portion of the axially extending rim axially overlaps the windings such that a least a portion of an outer circumferential surface of the axially extending rim is radially aligned with a portion of the windings.

In examples, an axial center of the windings of the motor stator is positioned diagonally from an axial center of the resolver stator, radially outside of and axially offset therefrom.

A resolver assembly is also provided that includes a resolver position sensor including a resolver stator and a resolver rotor configured for rotating within the resolver stator. The resolver stator generates a signal based on a rotational position of the resolver rotor. The resolver assembly also includes a bearing support including an inner circumferential surface for supporting a bearing. The bearing support is fixed to the resolver stator. The bearing support includes an axially extending rim extending axially away from the resolver stator and a flange radially outside of at least a portion of the resolver stator. The bearing support is or includes an electromagnetic interference shield such that the axially extending rim and the flange shield the resolver position sensor from electromagnetic waves originating from radially outside of the axially extending rim and the flange.

In examples, the resolver assembly further includes the bearing and an outer race of the bearing being supported on an inner circumferential surface of the axially extending rim.

In examples, the resolver assembly further includes an end housing and a fastener passing axially through the flange and the resolver stator into the end housing.

A method of constructing a motor assembly is also provided. The method includes non-rotatably connecting a rotor shaft to a rotor of a brushless motor; non-rotatably connecting a resolver rotor to the rotor shaft; and fixing a resolver stator axially between a bearing support and an end housing. Each of the bearing support and the end housing are or include an electromagnetic interference shield such that the bearing support and the end housing together shield the resolver stator from electromagnetic waves originating from windings of the brushless motor positioned radially outside of the resolver position sensor.

In examples, the method further includes installing an inner race of a bearing on an outer circumferential surface of the rotor shaft, and installing an outer race of the bearing on the bearing support.

In examples, the bearing support includes an axially extending rim supporting the bearing and extending axially away from the resolver stator. The bearing support includes a flange radially outside of at least a portion of the resolver stator. The fixing of the resolver stator axially between the bearing support and the end housing includes fixing the flange and the resolver stator to the end housing.

In examples, the fixing of the flange to the resolver stator and the end housing includes passing a fastener through the flange and the resolver stator and into the end housing.

In examples, the end housing includes a pilot and the fixing of the resolver stator axially between the bearing support and the end housing includes installing the resolver stator and a portion of the bearing support radially inside of the pilot.

BRIEF DESCRIPTION OF THE DRAWINGS

The present disclosure is described below by reference to the following drawings, in which.

DETAILED DESCRIPTION

Figure 1:
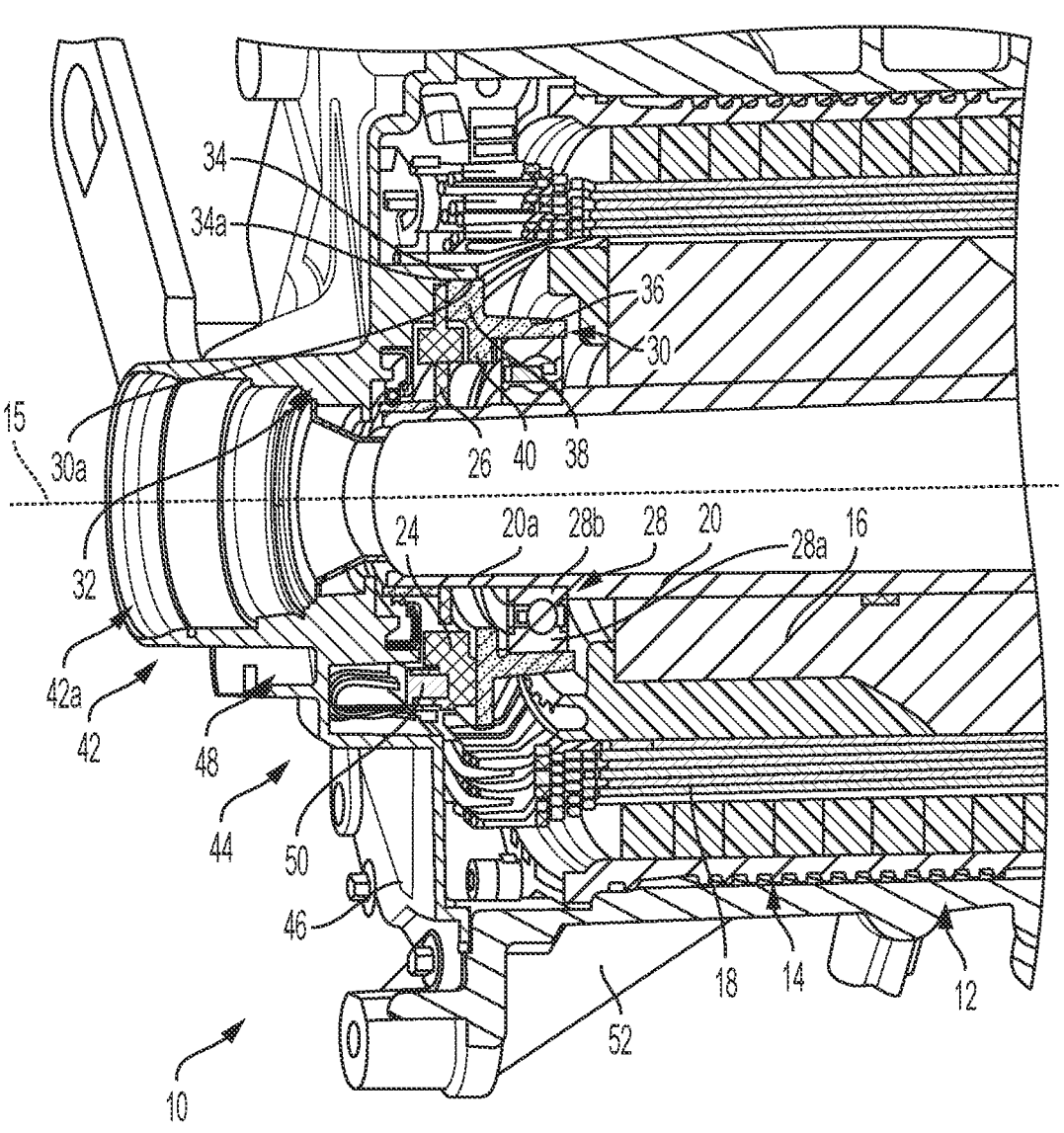
FIGS. 1 to 4 show different cross-sectional radially facing views of a motor assembly according to the present disclosure.
Figure 2:
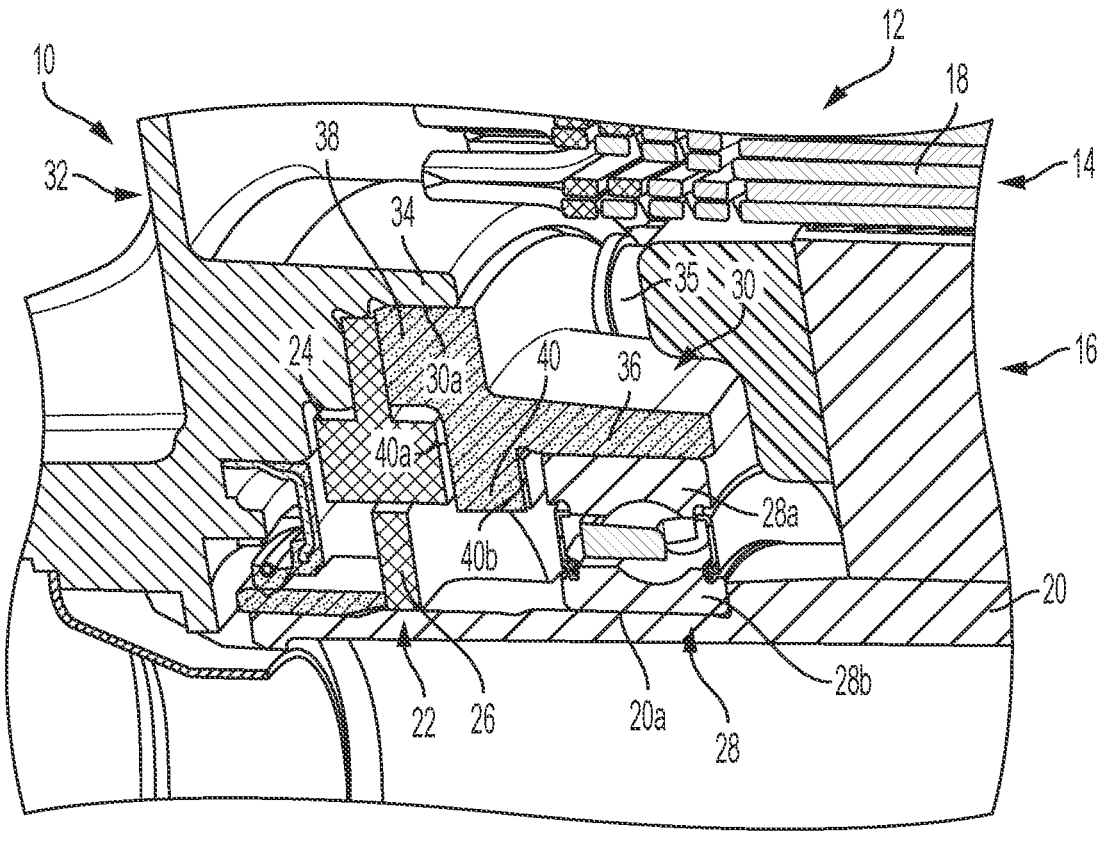
Figure 3:
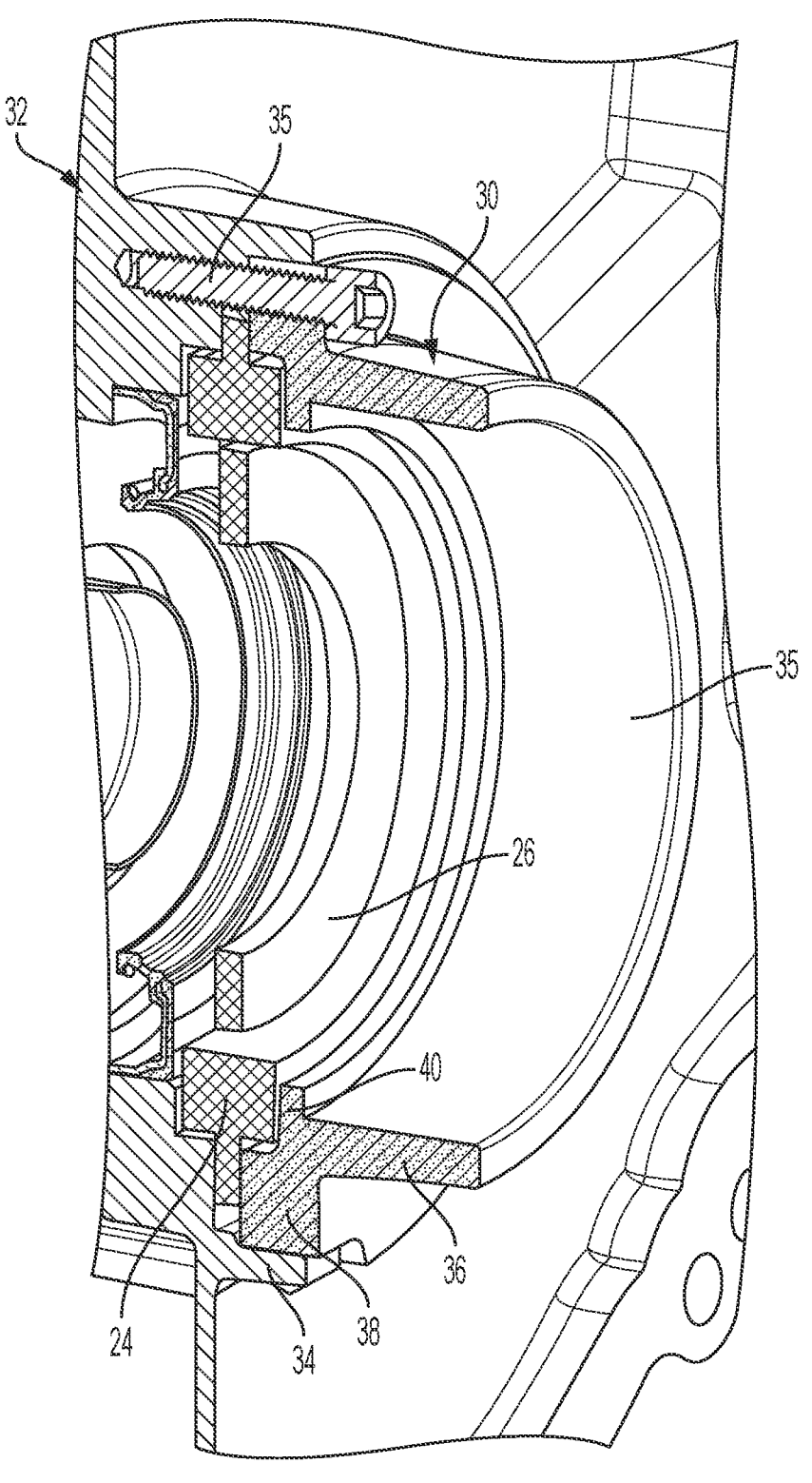

FIGS. 1 to 4 show different cross-sectional radially facing views of a motor assembly 10. Motor assembly 10 includes a brushless electric motor 12 including a motor stator 14 and a motor rotor 16 configured for rotating within the motor stator 14 about a center axis 15. The motor stator 14 includes a plurality of windings 18. Motor assembly 10 also includes a rotor shaft 20 non-rotatably connected to the motor rotor 16 for rotating with the motor rotor 16 and a resolver position sensor 22.

Resolver position sensor 22 includes a resolver stator 24 and a resolver rotor 26 configured for rotating within the resolver stator 24. The resolver rotor 26 is non-rotatably connected to the rotor shaft 20 for rotating with the rotor shaft. The resolver stator 24 generates a signal based on a rotational position of the resolver rotor 26. A rotor shaft bearing 28 is coupled to the rotor shaft 20.

A bearing support 30 supports the rotor shaft bearing 28 to allow the rotor shaft 20 to rotate with respect to the bearing support 30. The bearing support 30 is or includes, for example as a coating, an electromagnetic interference shield to reduce or block electromagnetic waves emitted by the windings 18 of the motor stator 14 from interfering with the signal generated by the resolver stator 24. An electrically conductive metallic material forming the bearing support 30 is the electromagnetic interference shield, or an electrically conductive metallic coating on the bearing support 30 is the electromagnetic interference shield. Thus, bearing support 30 advantageously perform two distinct functions—supporting rotor shaft bearing 28 and shielding the resolver position sensor 22 from electromagnetic waves emitted by the windings 18.

Motor assembly 10 further includes an end housing 32, which also acts an electromagnetic interference shield. Like bearing support 30, end housing 32 is or includes, for example as a coating, an electromagnetic interference shield to reduce or block electromagnetic waves emitted by the windings 18 of the motor stator 14 from interfering with the signal generated by the resolver stator 24. An electrically conductive metallic material forming the end housing 32 is the electromagnetic interference shield, or an electrically conductive metallic coating on the end housing 32 is the electromagnetic interference shield. The electrically conductive metallic material or electrically conductive metallic coating can for example be steel, aluminum, copper, nickel, silver, or gold. In some preferable examples, steel and aluminum can be used to form housing 32 and bearing support 30, and copper, nickel, silver, or gold can be used as coatings for housing 32 and bearing support 30.

The end housing 32 and bearing support 30 overlap each other to fully surround an outer diameter of the resolver position sensor 22. The end housing 32 includes a pilot 34, and an outer circumferential surface 30a of the bearing support 30 is received inside of the pilot 34 to create an axial overlap between pilot 34 and bearing support 30. An inner circumferential surface 34a of pilot 34 can contact outer circumferential surface 30a of bearing support 30.

Motor assembly 10 further includes a fastener 35 fixing the resolver stator 24 and bearing support 30 to the end housing 32. The bearing support 30 is axially between the motor rotor 16 and the resolver rotor 26. The windings 18 have voltage of 400 to 800 volts and the signal generated by the resolver stator 24 has a voltage of 2 to 12 volts.

The bearing support 30 has an annular shape and is fixed to the resolver stator 24. The bearing support 30 includes an axially extending rim 36 supporting the rotor shaft bearing 28 and extending axially away from the resolver stator 24. The bearing support 30 includes a flange 38 radially outside of at least a portion of the resolver stator 24. The axially extending rim 36 and the flange 38 arranged and configured for shielding the resolver position sensor 22 from electromagnetic waves originating from radially outside of the axially extending rim 36 and the flange 38.

The bearing support 30 further includes an inner lip 40 protruding radially inward from the axially extending rim 36. The inner lip 40 includes a first axially facing surface 40a facing the resolver stator 24 and a second axially facing surface 40b, opposite of the first axially facing surface 40a, facing the rotor shaft bearing 28.

Figure 4:
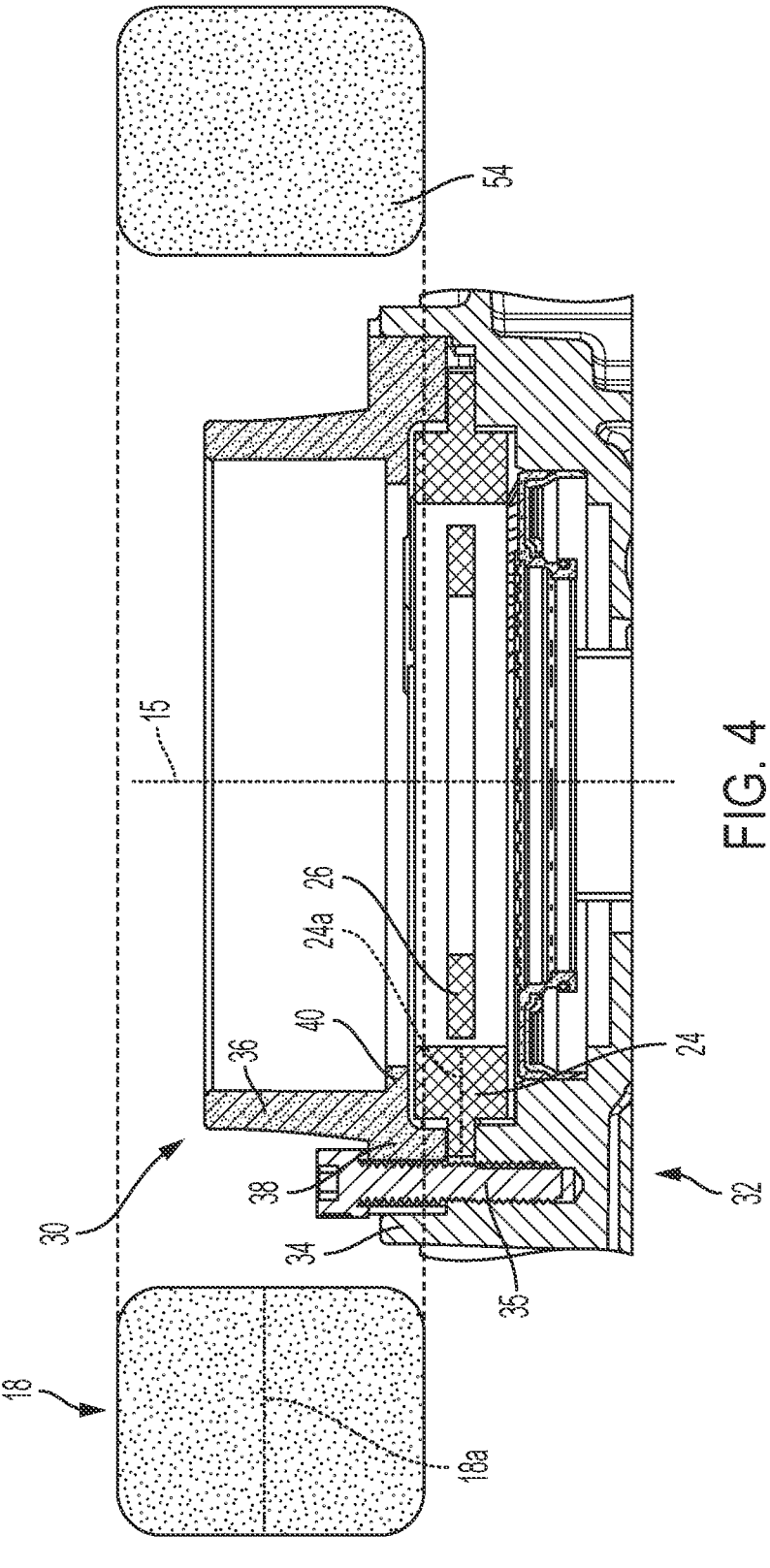

At least a portion of the axially extending rim 36 axially overlaps the windings 18 such that a least a portion of an outer circumferential surface 36a of the axially extending rim 36 is radially aligned with a portion of the windings 18. As shown in FIG. 4, an axial center 18a of the windings 18 of the motor stator 14 is positioned diagonally from an axial center 24a of the resolver stator 24, radially outside of and axially offset therefrom.

An outer race 28a of the bearing 28 is supported on an inner circumferential surface 36b of the axially extending rim 36. The fastener 35 passes axially through the flange 38 and the resolver stator 24 into a portion of end housing 32 that is radially inside of pilot 34 to fix bearing support 30 to end housing 32. This allows rotor shaft 20, via bearing 28, to rotate with respect to end housing 32.

End housing 32 includes a radially inner center section 42, which includes a hole 42a for receiving a shaft for coupling with rotor shaft 20. Radially outside of radially inner center section 42, end housing 32 further includes a radially intermediate section 44, which includes pilot 34. Radially intermediate section 44 includes a plug port 48, through which a plug 50 is inserted for connecting to resolver position sensor 22. Position signals are sent from resolver position sensor 22 to a controller of brushless electric motor 12 via plug 50. Radially outside of radially intermediate section 44, end housing 32 further includes a radially outer section 46, which is non-rotatably fixed to a mid-housing 52. Mid-housing 52 is positioned radially outside of motor stator 14 and together with end housing 32, protects motor stator 14 and motor rotor 16 from the surrounding environment.

A method of constructing motor assembly 10 includes non-rotatably connecting the rotor shaft 20 to motor rotor 16; non-rotatably connecting the resolver rotor 26 to the rotor shaft 20; and fixing the resolver stator 24 axially between the bearing support 30 and the end housing 32.

The method further includes installing an inner race 28b of the bearing 28 on an outer circumferential surface 20a of the rotor shaft 20, and installing the outer race 28a of the bearing 28 on the bearing support 30. The fixing of the resolver stator 24 axially between the bearing support 30 and the end housing 32 includes fixing the flange 38 and the resolver stator 24 to the end housing 32. The fixing of the flange 38 to the resolver stator 24 and the end housing 32 includes passing the fastener 35 through the flange 38 and the resolver stator 24 and into the end housing 32.

The fixing of the resolver stator 24 axially between the bearing support 30 and the end housing 32 includes installing the resolver stator 24 and a portion of the bearing support 30 radially inside of the pilot 34.

REFERENCE NUMERALS 10 motor assembly
12 brushless electric motor
14 motor stator
15 center axis
16 motor rotor
18 windings
18*a* axial center
20 rotor shaft
20*a* outer circumferential surface
22 resolver position sensor
24 resolver stator
24*a* axial center
26 resolver rotor
28 rotor shaft bearing
28*a* outer race
28*b* inner race
30 bearing support
30*a* outer circumferential surface
32 end housing
34 pilot
34*a* inner circumferential surface
35 fastener
36 axially extending rim
36*a* outer circumferential surface
36*b* inner circumferential surface
38 flange
40 inner lip
40*a* first axially facing surface
40*b* second axially facing surface
42 radially inner center section
42*a* hole
44 radially intermediate section
46 radially outer section
48 plug port
50 plug
52 mid-housing

What is claimed is:

1. A motor assembly comprising:
a brushless electric motor including a motor stator and a motor rotor configured for rotating within the motor stator, the motor stator including a plurality of windings;
a rotor shaft non-rotatably connected to the motor rotor for rotating with the motor rotor;
a resolver position sensor including a resolver stator and a resolver rotor configured for rotating within the resolver stator, the resolver rotor being non-rotatably connected to the rotor shaft for rotating with the rotor shaft, the resolver stator generating a signal based on a rotational position of the resolver rotor;
a rotor shaft bearing coupled to the rotor shaft;
a bearing support supporting the rotor shaft bearing to allow the rotor shaft to rotate with respect to the bearing support, the bearing support being or including an electromagnetic interference shield to reduce or block electromagnetic waves emitted by the windings of the motor stator from interfering with the signal generated by the resolver stator;
the bearing support being fixed to the resolver stator, the bearing support including an axially extending rim supporting the rotor shaft bearing and extending axially away from the resolver stator, the bearing support including a flange radially outside of at least a portion of the resolver stator, the axially extending rim and the flange arranged and configured for shielding the resolver position sensor from electromagnetic waves originating from radially outside of the axially extending rim and the flange.

2. The motor assembly as recited in claim 1 further comprising an end housing being or including an electromagnetic interference shield to reduce or block electromagnetic waves emitted by the windings of the motor stator from interfering with the signal generated by the resolver stator.

3. The motor assembly as recited in claim 2 wherein the end housing and bearing support overlap each other to fully surround an outer diameter of the resolver position sensor.

4. The motor assembly as recited in claim 2 wherein the end housing includes a pilot, an outer circumferential surface of the bearing support being received inside of the pilot.

5. The motor assembly as recited in claim 2 further comprising a fastener fixing the resolver stator and bearing support to the end housing.

6. The motor assembly as recited in claim 1 wherein the bearing support is axially between the motor rotor and the resolver rotor.

7. The motor assembly as recited in claim 1 wherein the windings have voltage of 400 to 800 volts and the signal generated by the resolver stator has a voltage of 2 to 12 volts.

8. The motor assembly as recited in claim 1 wherein an electrically conductive metallic material forming the bearing support is the electromagnetic interference shield, or an electrically conductive metallic coating on the bearing support is the electromagnetic interference shield.

9. The motor assembly as recited in claim 1 wherein the bearing support further includes an inner lip protruding radially inward from the axially extending rim, the inner lip including a first axially facing surface facing the resolver stator and a second axially facing surface, opposite of the first axially facing surface, facing the rotor shaft bearing.

10. The motor assembly as recited in claim 1 wherein at least a portion of the axially extending rim axially overlaps the windings such that at least a portion of an outer circumferential surface of the axially extending rim is radially aligned with a portion of the windings.

11. The motor assembly as recited in claim 1 wherein an axial center of the windings of the motor stator is positioned diagonally from an axial center of the resolver stator, radially outside of and axially offset therefrom.

12. A resolver assembly comprising:
a resolver position sensor including a resolver stator and a resolver rotor configured for rotating within the resolver stator, the resolver stator generating a signal based on a rotational position of the resolver rotor; and
a bearing support including an inner circumferential surface for supporting a bearing, the bearing support being fixed to the resolver stator, the bearing support including an axially extending rim extending axially away from the resolver stator and a flange radially outside of at least a portion of the resolver stator, the bearing support being or including an electromagnetic interference shield such that the axially extending rim and the flange shield the resolver position sensor from electromagnetic waves originating from radially outside of the axially extending rim and the flange.

13. The resolver assembly as recited in claim 12 further comprising the bearing, an outer race of the bearing being supported on an inner circumferential surface of the axially extending rim.

14. The resolver assembly as recited in claim 13 further comprising an end housing and a fastener passing axially through the flange and the resolver stator into the end housing.

15. A method of constructing a motor assembly comprising:

non-rotatably connecting a rotor shaft to a rotor of a brushless motor;

non-rotatably connecting a resolver rotor to the rotor shaft; and fixing a resolver stator axially between a bearing support and an end housing, each of the bearing support and the end housing being or including an electromagnetic interference shield such that the bearing support and the end housing together shield the resolver stator from electromagnetic waves originating from windings of the brushless motor positioned radially outside of the resolver position sensor;

the bearing support including an axially extending rim supporting the bearing and extending axially away from the resolver stator, the bearing support including a flange radially outside of at least a portion of the resolver stator, the fixing of the resolver stator axially between the bearing support and the end housing including fixing the flange and the resolver stator to the end housing.

16. The method as recited in claim 15 further comprising installing an inner race of a bearing on an outer circumferential surface of the rotor shaft, and installing an outer race of the bearing on the bearing support.

17. The method as recited in claim 15 wherein the fixing of the flange to the resolver stator and the end housing including passing a fastener through the flange and the resolver stator and into the end housing.

18. The method as recited in claim 15 wherein the end housing includes a pilot, the fixing of the resolver stator axially between the bearing support and the end housing including installing the resolver stator and a portion of the bearing support radially inside of the pilot.

* * * * *